US006091875A

United States Patent [19]
Lindsay, Jr. et al.

[11] Patent Number: 6,091,875
[45] Date of Patent: Jul. 18, 2000

[54] OPTICAL FIBER RIBBON MIDSPAN SPLITTER DEVICE

[75] Inventors: Ronald G. Lindsay, Jr., Raleigh, N.C.; John P. Sarbell, Grand Island, Fla.

[73] Assignee: Sumitomo Electric Ligthwave Corp., Research Triangle Park, N.C.

[21] Appl. No.: 09/090,815

[22] Filed: Jun. 4, 1998

[51] Int. Cl.[7] .................................................. G02B 6/00
[52] U.S. Cl. .............................. 385/134; 385/65; 385/83; 385/114; 385/147
[58] Field of Search .................................... 385/134, 135, 385/137, 136, 138, 139, 147, 114, 65, 83; 156/344

[56] References Cited

U.S. PATENT DOCUMENTS

| | | | |
|---|---|---|---|
| 5,460,682 | 10/1995 | Beasley et al. | 156/344 |
| 5,460,683 | 10/1995 | Beasley, Jr. et al. | 156/344 |
| 5,926,598 | 7/1999 | Klein | 385/137 |
| 5,999,682 | 12/1999 | Vincent et al. | 385/134 |

*Primary Examiner*—Phan T. H. Palmer
*Attorney, Agent, or Firm*—Jenkens & Wilson, P.A.

[57] ABSTRACT

A optical fiber ribbon midspan splitter tool for quick and easy midspan splitting of an optical fiber ribbon into separate ribbon sub-groups for mass splicing. The device comprises a pair of splitter tool sections each having a base and a lid and defining a slot through the splitter tool. The pair of elongate tool sections are rotatably mounted about a transverse hinge through both sections adjacent one end of the tool. The pair of lids are each mounted to a respective one of a pair of bases so as to open upwardly and outwardly for placement of an optical fiber ribbon in the slot defined within the two adjacent bases of the splitter tool. Magnets are provided at the juncture of the splitter tool sections for maintaining the splitter tool sections in releasable alignment, and a pair of magnets are provided in each splitter tool section at the juncture of the base and the lid for releasably maintaining the base and lid in abutting enclosed relationship. Thus, an optical fiber ribbon can be inserted into the tool and the pair of splitter tool sections twisted in opposite directions to split the ribbon into two separate sub-ribbons for midspan mass splicing. A second embodiment of the splitter tool is also described.

7 Claims, 4 Drawing Sheets

OPTICAL FIBER RIBBON MIDSPAN SPLITTER DEVICE

TECHNICAL FIELD

The present invention relates to optical fiber ribbon, and more particularly to a device for quickly and easily splitting an optical fiber ribbon midspan into separate ribbon subgroups for mass splicing.

RELATED ART

Optical fiber cables containing optical fiber ribbons have been used in the telecommunications industry for quite a number of years. As is well known to those skilled in the art, an optical fiber ribbon consists of a plurality of optical fibers that are longitudinally laid parallel and adjacent to one another and then edge-bonded or encapsulated together with a plastic matrix material. Optical fiber ribbons normally incorporate 4, 6, and 12 optical fibers, although other numbers of optical fibers can be used in an optical fiber ribbon.

As is also well known to one skilled in the art, splicing is the process of joining optical fibers together. While single splicing involves joining one fiber at a time, mass splicing such as typically used for optical fiber ribbons involves joining multiple fibers simultaneously. Optical fiber ribbons lend themselves to mass splicing in view of their unique structure. If a user wishes to mass splice a number of optical fibers less than the number contained in an optical fiber ribbon, those fibers must first be separated from the optical fiber ribbon. When the end of the optical fiber ribbon is easily accessible, individual fibers or groups of fibers can typically be rather easily separated or split away from the ribbon for splicing. However, when the ribbon is accessed in midspan in circumstances where the end of the optical fiber ribbon is not available, it is quite difficult to split groups of optical fibers from an optical fiber ribbon.

A number of conventional methods for midspan accessing optical fibers within an optical fiber ribbon are presently known and used. These methods generally involve removing the ribbon matrix to expose all of the optical fibers within an optical fiber ribbon. However, these methods are not particularly advantageous since removing the ribbon matrix results in loose fibers in the area being accessed. This lack of optical fiber ribbon integrity acts to prevent the performance of mass splicing of the optical fibers. Unfortunately, separate steps are typically required to rebuild a section of optical fiber ribbon containing the required number of optical fibers so that mass splicing can be performed.

Applicants' invention provides an optical fiber ribbon midspan splitter device which, in one step, allows an optical fiber ribbon to be quickly and easily split in midspan into separate ribbon subgroups for efficient mass splicing. The novel device significantly improves productivity by reducing splice preparation time and effort. Also, applicants desire to note that applicants' assignee owns U.S. Pat. No. 5,460,682 and U.S. Pat. No. 5,460,683 to Beasley that disclose methods for midspan entry of optical fiber ribbons. However, applicants do not believe that any of the references either singly or in combination disclose the midspan splitter tool invention for separating optical fiber ribbons into subgroups for mass splicing.

Thus, there is a long-felt need in the fiber optic art for a quick and reliable midspan splitter tool for quickly and easily splitting an optical fiber ribbon midspan into separate ribbon subgroups for mass splicing. Applicants have unexpectedly and surprisingly discovered a simple and effective device to meet this need.

DISCLOSURE OF THE INVENTION

In accordance with the teachings of the present invention, the problem of quick and easy midspan splitting of an optical fiber ribbon into subgroups for mass splicing has been overcome. The optical fiber ribbon midspan splitter tool of the invention comprises a pair of elongate splitter tool sections both having a base and a corresponding lid and being in side-by-side alignment such that the splitter tool sections are rotatable relative to each other about a hinge extending transversely through both splitter tool sections adjacent one end of the splitter tool. The lid of each splitter tool section is mounted to its respective base by a hinge located adjacent the outer side of each respective splitter tool section to enable each of the lids to be pivoted upwardly and outwardly toward its respective splitter tool section outer side in order to open the midspan splitter tool for insertion of an optical fiber ribbon therein. A longitudinally extending slot is defined within the adjacent bases of the side-by-side aligned splitter tool sections for snugly receiving an optical fiber ribbon therein, and the top of the slot is defined by the adjacent lids of the splitter tool sections. First magnet means are mounted at the juncture of the pair of splitter tool sections for releasably maintaining the splitter tool sections in side-by-side alignment, and second magnet means are provided in each of the pair of splitter tool sections at the juncture of the base and the corresponding lid thereof for releasably maintaining the base and lid located in each of the splitter tool sections in closed abutting relationship. Thus, an optical fiber ribbon can be inserted into the splitter tool and the pair of splitter tool sections then twisted in opposite directions in order to split the optical fiber ribbon into two separate sub-ribbons to facilitate midspan mass splicing.

Another embodiment of the invention provides for an optical fiber ribbon midspan splitter tool having an elongate base with first and second ends and defining a vertical slot along the length thereof for fully receiving the width of an optical fiber ribbon therein. The base further includes a recess in the medial portion and extending transversely of the base and the vertical slot extends across the recess. First and second clamp means are mounted adjacent corresponding first and second ends of the base for releasably securing an optical fiber ribbon within the base. Also, a transversely movable slide is mounted within the medial recess adjacent the vertical slot and extends a predetermined distance above the vertical slot. The transversely movable slide is adapted for being urged against an exposed predetermined portion of the width of an optical fiber ribbon located within the recessed portion of the vertical slot for splitting the predetermined portion of the width of an optical fiber ribbon from the remaining portion remaining within the vertical slot.

It is therefore the object of the present invention to provide and improve midspan access device for an optical fiber ribbon.

It is another object of the present invention to provide an improved midspan splitter device for optical fiber ribbon which allows a optical fiber ribbon to be quickly and easily split in midspan into separate subgroups for mass splicing.

It is another object of the present invention to provide a midspan splitter device for optical fiber ribbon which quickly and easily splits the optical fiber ribbon in midspan into separate subgroups for mass splicing so as to improve productivity by reducing splice preparation time.

It is still another object of the present invention to provide a midspan splitter device which, in one step, splits an optical fiber ribbon in midspan into separate ribbon subgroups for mass splicing.

Some of the objects of the invention having been stated hereinabove, other objects will become evident as the description proceeds, when taken in connection with the accompanying drawings which are described below.

BEST MODE FOR CARRYING OUT THE INVENTION

Figure 1:
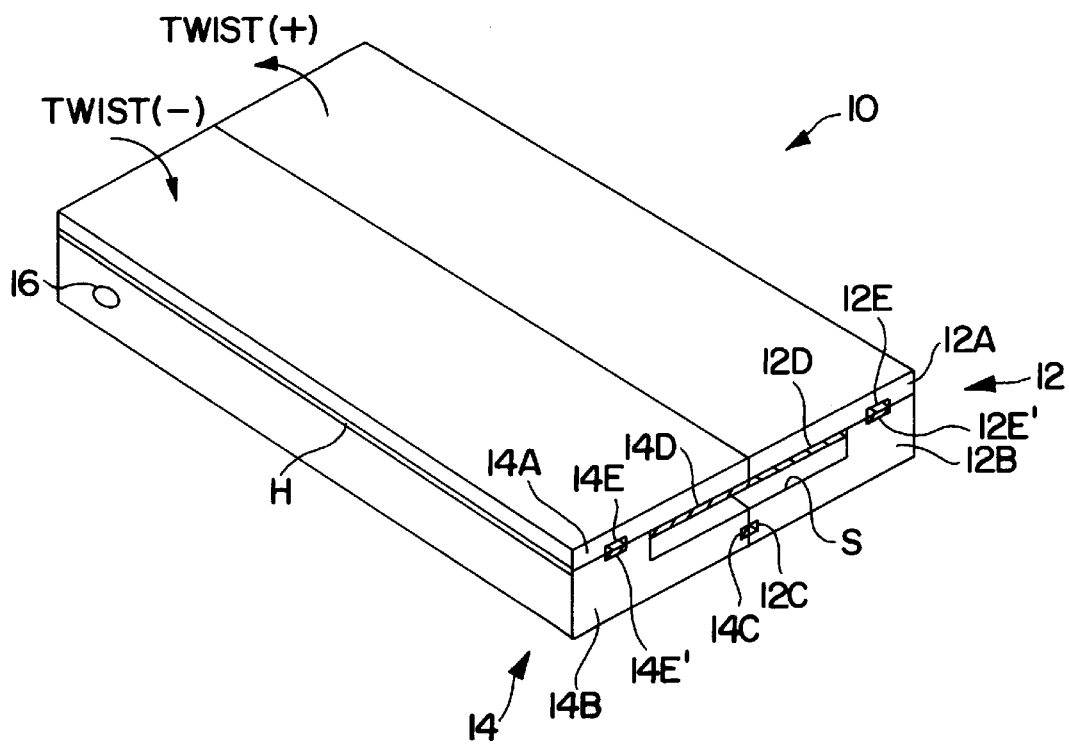
FIG. 1 is a perspective view of the optical fiber ribbon midspan splitter device of the present invention.

Referring now to the drawings, applicants will describe the novel optical fiber ribbon midspan splitter device of the subject invention in detail for the complete understanding of one skilled in the fiber optic art.

Figure 5A:
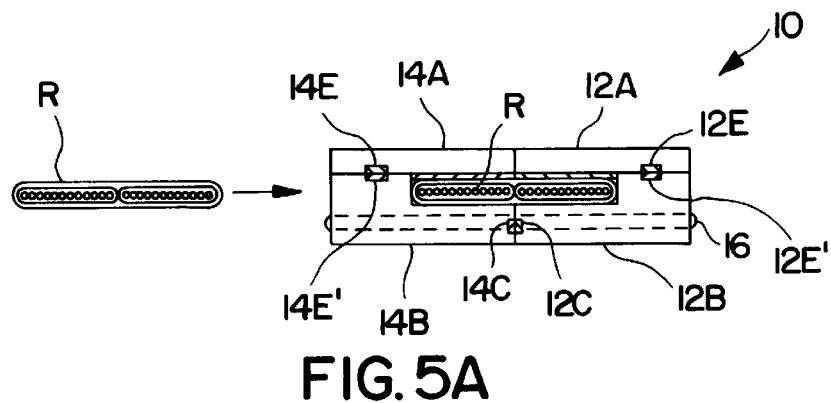
FIGS. 5A–5B are end elevation and top plan views, respectively, of the optical fiber ribbon midspan splitter device of the present invention illustrating the splitting by twisting of an optical fiber ribbon into sub-ribbons for mass splicing.
Figure 5B:
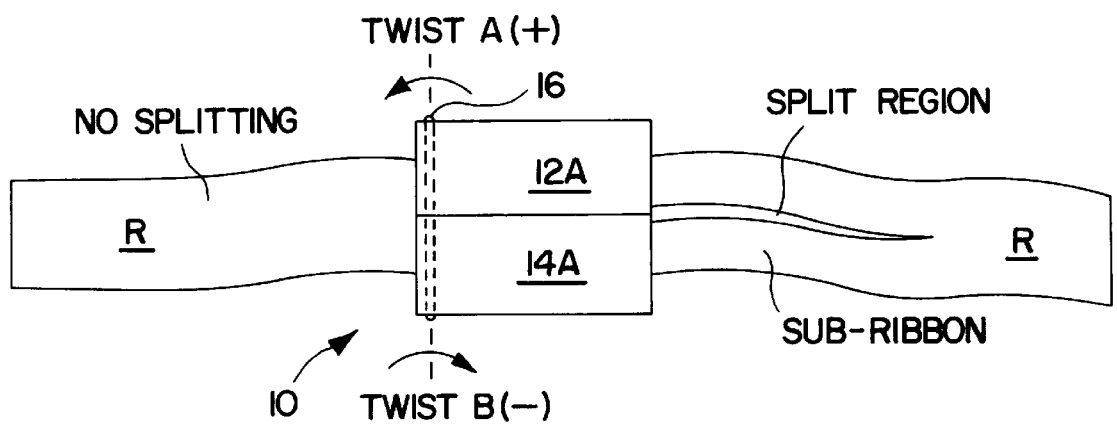

Applicants' optical fiber ribbon midspan splitter device is generally designated 10 and comprises a base that is divided into two halves, generally designated 12 and 14, which can be rotated independently of one another as best seen in FIGS. 5A, 5B of the drawings. Two base sections 12 and 14 pivot about a fixed pin 16 (see FIGS. 1–3 and 5A–5B) which extends through both base sections 12 and 14 at the uppermost end of device 10 as seen in FIG. 1. Base sections 12 and 14 each comprise a lid 12A and 14A and a base 12B and 14B. Base sections 12 and 14 are releasably held together and in alignment with a pair of magnets 12C and 14C which are aligned in abutting relationship along the length of respective bases 12B and 14B of base sections 12 and 14. The abuttingly aligned linear pair of magnets 12C and 14C will serve to maintain base sections 12 and 14 in fixed alignment so as to define a planar top surface defined by lids 12A and 14A and a planar bottom surface defined by bases 12B and 14B until the two halves are twisted in opposite directions in order to effect midspan splitting of an optical fiber ribbon into separate ribbon subgroups for mass splicing in a manner to be described in more detail hereinbelow.

Figure 2:
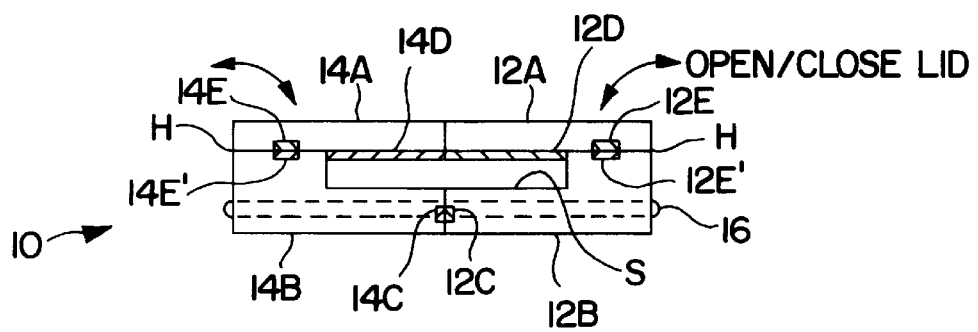
FIG. 2 is an end elevation view of the optical fiber ribbon midspan splitter device of the present invention.
Figure 3:
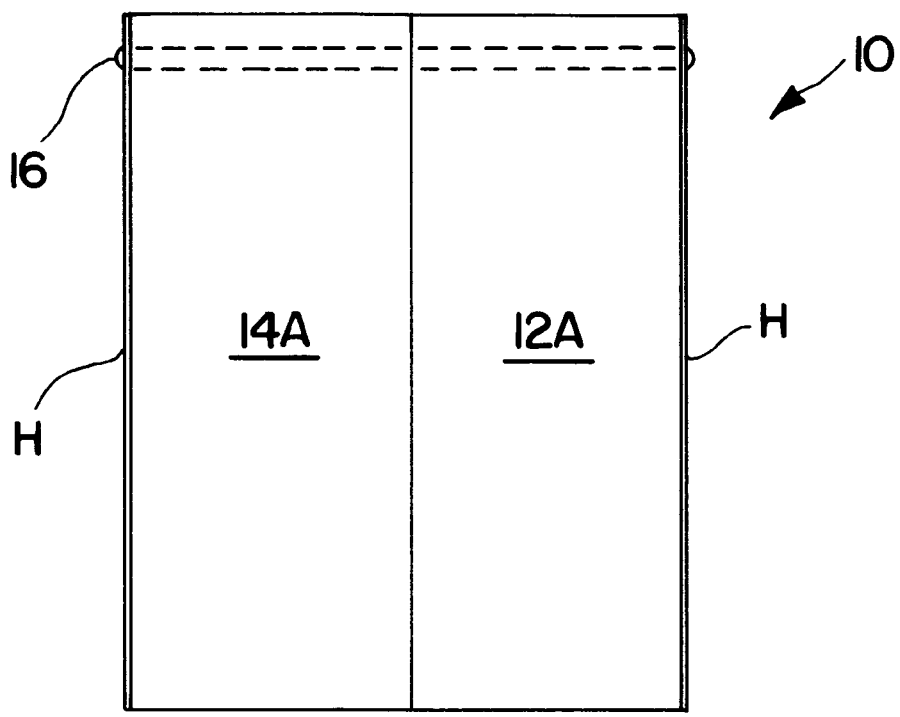
FIG. 3 is a top plan view of the optical fiber ribbon midspan splitter device of the present invention.
Figure 4:
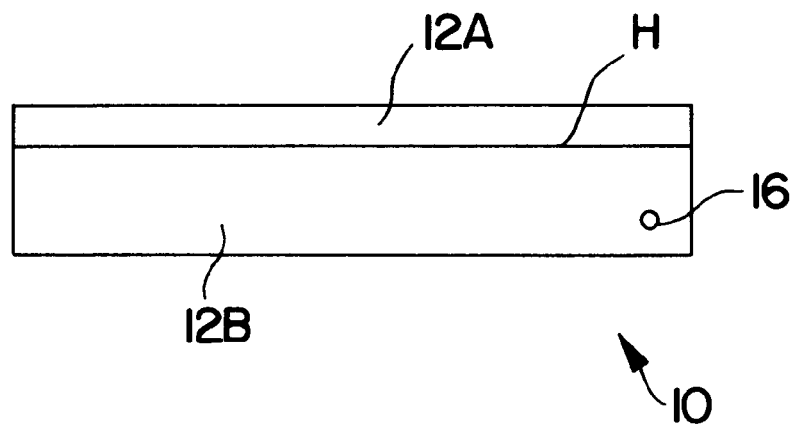
FIG. 4 is a side elevation view of the optical fiber ribbon midspan splitter tool of the present invention.

Lids 12A, 14A are pivotably attached to bases 12B, 14B, respectively, by opposing hinges H mounted on the outer side of each of base sections 12 and 14 (see particularly FIGS. 1–2 and 3). Bases 12B and 14B and corresponding lids 12A and 14A of base sections 12 and 14 fit together when closed and in alignment to form a common slot S for snugly receiving and holding an optical fiber ribbon R. Lids 12A and 14A are both raised upwardly and outwardly (see FIG. 2) to accommodate fitting ribbon R into slot S, and lids 12A and 14A are then closed over ribbon R (see FIG. 5A). A thin rubber pad 12D and 14D, respectively, is adhered to the bottom side of each lid 12A, 14A to provide a controlled clamping force on optical fiber ribbon R. When lids 12A, 14A are closed, optical fiber ribbon R is held in midspan splitter device 10 with sufficient force not to be easily moved relative to device 10.

Lids 12A, 14A are releasably maintained in a closed position by a corresponding pair of magnets 12E, 12E' in base section 12 and the pair of magnets 14E and 14E' in abutting base section 14. Magnets 12E and 14E extend along the length of respective lids 12A and 14A and are in abutting relationship with corresponding magnets 12E' and 14E' that extend along the length of respective bases 12B and 14B.

Optical fiber ribbons R can be split in midspan by use of the following method with device 10:

(1) place ribbon R into slot S in midspan splitter device 10 and close both lids 12A and 14A (see FIG. 5A);

(2) twist base sections 12 and 14 in opposite directions to apply a shear force to optical fiber ribbon R so as to cause a controlled split down the center of ribbon R (see FIG. 5B); and (3) observe creation of two separate sub-ribbons that have been created by the controlled split down the middle of original ribbon R (see FIG. 5B).

SECOND EMBODIMENT OF THE INVENTION

Figure 6A:
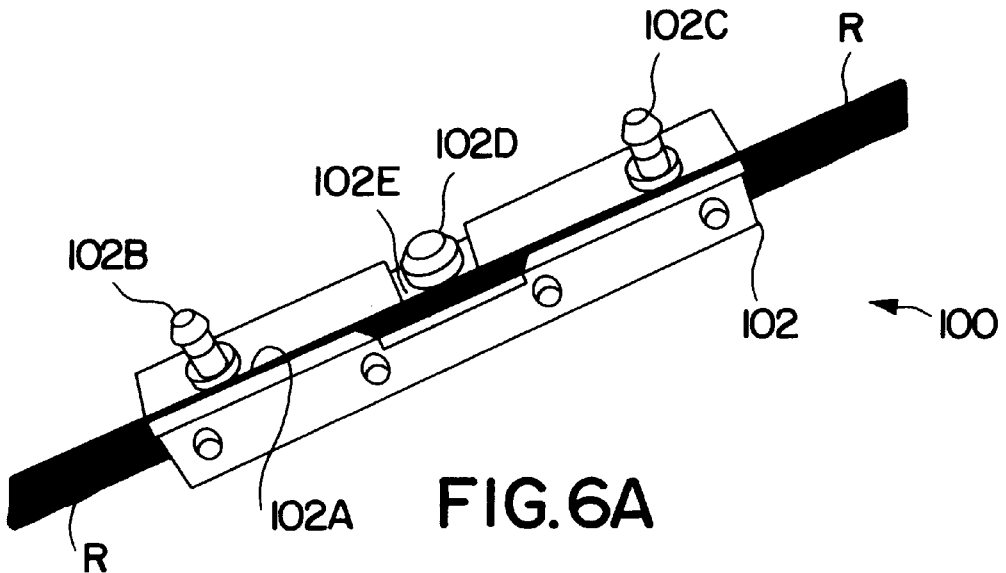
FIGS. 6A–6B are perspective and top plan views, respectively, of a second embodiment of the optical fiber ribbon midspan splitter device of the present invention illustrating how the device is used to split an optical fiber ribbon into sub-ribbons for mass splicing.
Figure 6B:
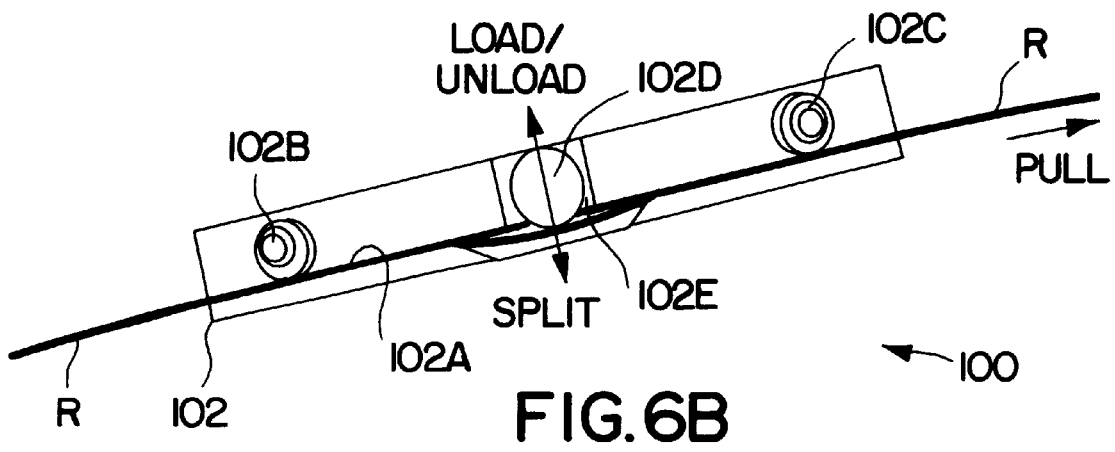

Referring now to FIGS. 6A and 6B, an alternative embodiment of the optical fiber ribbon midspan splitter device is shown and generally designated 100. Device 100 consists of a base 102 defining a vertical slot 102A therein for an optical fiber ribbon R to be fully received across the entire length thereof (see FIGS. 6A and 6B). Two clamps 102B and 102C are located on opposing ends of device 100 for being (1) tightened or otherwise adjusted in order to secure optical fiber ribbon R in place in vertical slot 102A of the base of device 100 and (2) loosened or otherwise adjusted in order to release engagement of ribbon R by clamps 102B and 102C within vertical slot 102A. A circular slide 102D is mounted in a cut-out or recessed portion 102E located in the medial portion of midspan splitter device 100. Circular slide 102D is mounted in recessed portion 102E and adapted for transverse movement from an unload position to a load position wherein the portion of circular slide 102D extending above both slot 102A and recessed area 102E can be urged against the exposed portion of optical fiber ribbon R in recessed area 102E. As will be appreciated, although slot 102A is sized so as to fully receive the width of optical fiber ribbon R substantially throughout the length of device 100, a portion of optical fiber ribbon R secured within device 100 will be exposed in the recessed medial portion 102E wherein circular slide 102D is slidably mounted for transverse movement from an unload position (out of interference with slot 102A) to a load position (extending across slot 102A in recessed portion 102E of splitter device 100).

In use, after a user inserts optical fiber ribbon R into slot 102A, clamps 102B and 102C are rotated to their respective tightened positions. Thus, only the portion to be split of the width of ribbon R is exposed in recessed area 102E of device 100. The top portion of optical fiber ribbon R can be split from the bottom portion of ribbon R by advancing circular slide 102D toward the load position on the front side of tool 100 (see FIGS. 6A and 6B) to a position beyond ribbon slot 102A of device 100 (as shown in FIG. 6B). This action will cleanly and accurately separate the top exposed portion of optical fiber ribbon R containing a predetermined desired number of optical fibers from the bottom portion of ribbon R which is still located within vertical slot 102A of recessed area 102E of midspan splitter device 100. Also, the user at this point can continue the midspan split of ribbon R into sub-groups for mass splicing along the ribbon length by holding circular slide 102D in the load or advanced position and pulling ribbon R through device 100 in either direction. Applicant would like to note that either embodiment of the invention can be used with optical fiber ribbons containing a wide variety of optical fibers including but not limited to optical fiber counts of 4, 6, 8, 12, and 24 per optical fiber ribbon R.

It will be understood that various details of the invention may be changed without departing from the scope of the invention. Furthermore, the foregoing description is for the purpose of illustration only, and not for the purpose of limitation—the invention being defined by the claims.

What is claimed is:

1. An optical fiber ribbon midspan splitter tool comprising:
   (a) a pair of elongate splitter tool sections having a base and a lid and in side-by-side alignment wherein said splitter tool sections are relatively rotatable about first hinge means extending transversely through both splitter tool sections adjacent one end of said splitter tool;
   (b) said lid of each splitter tool section being mounted to its respective base by second hinge means adjacent the outer side of each respective splitter tool section so that each of said lids can be pivoted upwardly and outwardly toward its respective splitter tool section outer side to open said splitter tool for insertion of an optical fiber ribbon to be split;
   (c) a longitudinally extending slot defined within the adjacent bases of said two side-by-side aligned splitter tool sections for snugly receiving an optical fiber ribbon therein, and the top of said slot being defined by the adjacent lids of said two side-by-side aligned splitter tool sections;
   (d) first magnet means mounted at the juncture of said pair of splitter tool sections for releasably maintaining said pair of splitter tool sections in side-by-side alignment; and
   (e) second magnet means mounted in each of said pair of splitter tool sections at the juncture of said base and said lid thereof for releasably maintaining said base and lid in abutting relationship;
whereby an optical fiber ribbon can be inserted into said splitter tool and said pair of splitter tool sections twisted in opposite directions in order to shear the fiber ribbon into 2 separate sub-ribbons to facilitate midspan mass splicing.

2. The optical fiber ribbon midspan splitter tool according to claim 1 wherein said first hinge means comprises a pin extending through said bases of both side-by-side splitter tool sections.

3. The optical fiber ribbon midspan splitter tool according to claim 1 wherein said second hinge means comprises a hinge on the outer side of each splitter tool section being connected to both said lid and said base thereof.

4. The optical fiber ribbon midspan splitter tool according to claim 1 wherein the bottom portions of said two lids defining the top of said slot are each provided with a rubber pad to facilitate clamping engagement of an optical fiber ribbon in said slot of said splitter tool.

5. The optical fiber ribbon midspan splitter tool according to claim 1 wherein said first magnet means comprises an elongate magnet mounted along the inside length of said base of one said tool section and an elongate magnet mounted in abutting relationship along the inside length of said base of said other tool section.

6. The optical fiber ribbon midspan splitter tool according to claim 1 wherein said second magnet means comprises an elongate magnet mounted in each of said bases of said two tool sections and extending longitudinally thereof, and a corresponding elongate magnet mounted in abutting relationship in each of said respective lids of said two tool sections and extending longitudinal thereof.

7. An optical fiber ribbon midspan splitter tool comprising:
   (a) an elongate base having first and second ends and defining a slot along the length thereof for fully receiving the width of an optical fiber ribbon therein, and said base further defining a recess in the medial portion thereof extending transversely of said elongate base and wherein said vertical slot extends through said recess;
   (b) first and second clamp means mounted between corresponding first and second ends of said base and said medial recess for releasably securing an optical fiber ribbon within said slot of said base; and
   (c) transversely movable slide means mounted within said medial recess adjacent said slot and extending a predetermined distance above said slot, said slide means being adapted for being urged against an exposed predetermined portion of the width of an optical fiber ribbon positioned within the recessed portion of said slot for splitting said predetermined portion of the width of an optical fiber ribbon from the remaining portion of an optical fiber ribbon remaining within the portion of said slot extending through said recess in said base.

* * * * *